US005772744A

United States Patent [19]
Gundlach et al.

[11] Patent Number: 5,772,744
[45] Date of Patent: Jun. 30, 1998

[54] INK COMPOSITIONS FOR THERMAL INK PRINTING

[75] Inventors: Kurt B. Gundlach, Fairport; Richard L. Colt, Rochester; Edward J. Radigan, Jr., Caledonia, all of N.Y.

[73] Assignee: Xerox Corporation, Stamford, Conn.

[21] Appl. No.: 961,335

[22] Filed: Oct. 30, 1997

[51] Int. Cl.$^6$ ................................................. C09D 11/02
[52] U.S. Cl. ................................. 106/31.43; 106/31.49; 106/31.75; 106/31.78
[58] Field of Search .......................... 106/31.43, 31.49, 106/31.75, 31.78

[56] References Cited

U.S. PATENT DOCUMENTS

| | | | |
|---|---|---|---|
| 3,948,668 | 4/1976 | Hayek et al. | 106/31.59 |
| 4,880,565 | 11/1989 | Rose et al. | 106/31.43 |
| 5,019,166 | 5/1991 | Schwarz | 106/22 |
| 5,156,675 | 10/1992 | Breton et al. | 106/31.58 |
| 5,389,133 | 2/1995 | Gundlach et al. | 106/22 H |
| 5,401,303 | 3/1995 | Stoffel et al. | 106/20 R |
| 5,531,815 | 7/1996 | Gundlach et al. | 106/20 R |
| 5,540,765 | 7/1996 | Gundlach et al. | 106/20 R |
| 5,560,766 | 10/1996 | Gundlach | 106/31.27 |
| 5,560,770 | 10/1996 | Yatake | 106/31.58 |
| 5,690,722 | 11/1997 | Pawlowski | 106/31.86 |

*Primary Examiner*—Helene Klemanski
*Attorney, Agent, or Firm*—Judith L. Byorick

[57] ABSTRACT

Disclosed is an ink composition which comprises water, a colorant, betaine, a tertiary amine, and a material of the formula $[(F_{2n+1}C_nCH_2S)_2(CH_3)C-CH_2CH_2COO^-][B^+]$, wherein n is an integer of from about 8 to about 20 and B is a cation. In one specific embodiment, n is 10 and B is $(HO-CH_2CH_2)_2NH_3^+$. In another specific embodiment, the tertiary amine is 1-methylimidazole. In yet another specific embodiment of the present invention, the colorant is an anionic dye with carboxylate groups, sulfonate groups, or both carboxylate and sulfonate groups. Also disclosed is a process for preparing the aforementioned ink composition wherein a liquid containing the material of the formula $[(F_{2n+1}CnCH_2S)_2(CH_3)C-CH_2CH_2COO^-][B^+]$ is subjected to centrifugation. Also disclosed are ink jet printing processes employing the aforementioned ink.

16 Claims, No Drawings

INK COMPOSITIONS FOR THERMAL INK PRINTING

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises water, a colorant, betaine, a tertiary amine, and a material of the formula $[(F_{2n+1}C_nCH_2S)_2(CH_3)C—CH_2CH_2COO^-][B^+]$, wherein n is an integer of from about 8 to about 20 and B is a cation. In one specific embodiment, n is 10 and B is $(HO—CH_2CH_2)_2NH_2^+$. In another specific embodiment, the tertiary amine is 1-methylimidazole. Another embodiment of the present invention is directed to an ink composition which comprises water, a colorant, betaine, a tertiary amine, a material of the formula $[(F_{2n+1}C_nCH_2S)_2(CH_3)C—CH_2CH_2COO^-][B^+]$, wherein n is an integer of from about 8 to about 20 and B is a cation, and an anionic dye with carboxylate groups, sulfonate groups, or both carboxylate and sulfonate groups. Yet another embodiment of the present invention is directed to a process for preparing an ink composition which comprises (a) providing a liquid composition containing a material of the formula $[(F_{2n+1}C_nCH_2S)_2(CH_3)C—CH_2CH_2COO^-][B^+]$, wherein n is an integer of from about 8 to about 20 and B is a cation; (b) subjecting the liquid composition to centrifugation, thereby causing the composition to separate into a supernatant top layer and a flocculated bottom layer; (c) separating the supernatant top layer from the flocculated bottom layer; and (d) admixing the supernatant top layer with an aqueous liquid vehicle and a colorant, thereby forming an ink composition.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,401,303 (Stoffel et al.), the disclosure of which is totally incorporated herein by reference, discloses a process wherein the halo effect seen at the interface between a first ink, exhibiting sharp edge acuity, and a second ink, having low surface energy, is addressed by adding certain fluorocarbon compounds to the first ink. Edge acuity of the first ink is maintained.

U.S. Pat. No. 5,540,765 (Gundlach et al.), the disclosure of which is totally incorporated herein by reference, discloses a thermal ink jet printing composition which contains a surfactant comprising an alkylsulfoxide having an alkyl group of 4 to 6 carbon atoms. Preferably, the composition contains a betaine zwitterionic base and dibutylsulfoxide.

U.S. Pat. No. 5,531,815 (Gundlach et al.), the disclosure of which is totally incorporated herein by reference, discloses a thermal ink jet printing composition contains a betaine zwitterionic base and a quasisurfactant penetrant.

U.S. Pat. No. 5,389,133 (Gundlach et al.), the disclosure of which is totally incorporated herein by reference, discloses a process for preparing an aqueous ink composition which comprises adjusting the pH of the ink with phosphorous acid or phosphite salts. Also disclosed are ink compositions prepared by this process. In certain preferred embodiments, the ink compositions can also contain betaine, sulfolane, dimethyl sulfoxide, or N,N'-bis(3-aminopropyl)-1,2-ethylenediamine, as well as mixtures thereof. In other preferred embodiments, the ink composition comprises an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof.

Copending application U.S. Ser. No. 08/961,435, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, and Edward J. Radigan, Jr., the disclosure of which is totally incorporated herein by reference, discloses an ink composition which comprises (a) water, (b) a colorant, (c) a fluorinated material selected from: (1) those of the formula $[(F_{2n+1}C_nCH_2S)_2(CH_3)C-CH_2CH_2COO^-][B^+]$, wherein n is an integer of from about 8 to about 20 and B is a cation, (2) those of the formula $[(F_3C(F_2C)_nCH=CHCH_2OCH(OH)CH_2)_2NCH_2COO^-][X^+]$, wherein X is a cation and n is an integer of from about 3 to about 20, and (3) mixtures thereof, and (d) a monomeric compound having at least two carboxylic acid functional groups. Also disclosed is a process for preparing said ink composition which comprises (i) admixing the ink ingredients, and (ii) subjecting the mixture thus formed to ultrasonification, thereby reducing the average particle diameter of liposomes of the fluorinated material in the ink. Further disclosed is a process which entails (i) incorporating into an ink jet printing apparatus the aforementioned ink composition, and (ii) causing droplets of the ink composition to be ejected in an imagewise pattern onto a substrate. In a preferred embodiment, the printing apparatus employs a thermal ink jet process wherein the ink in the nozzles is selectively heated in an imagewise pattern, thereby causing droplets of the ink to be ejected in imagewise pattern.

Copending application U.S. Ser. No. 08/961,118, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, Danielle Avolio, and Rachael L. McGrath, the disclosure of which is totally incorporated herein by reference, discloses an ink composition which comprises (a) water, (b) a colorant, and (c) a material of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are processes for preparing the ink composition and ink jet printing processes with the ink composition.

Copending application U.S. Ser. No. 08/961,461, filed concurrently herewith, entitled "Improved Ink Compositions for Thermal Ink Jet Printing," with the named inventors Kurt B. Gundlach and Walter F. Wafler, the disclosure of which is totally incorporated herein by reference, discloses an ink composition which comprises water, a colorant, a nonionic surfactant, and a fluorinated material selected from the group consisting of (a) those of the formula $[(F_{2n+1}C_nCH_2S)_2(CH_3)C-CH_2CH_2COO^-][B^+]$, wherein n is an integer of from about 8 to about 20 and B is a cation, and (b) those of the formula $[(F_3C(F_2C)_nCH=CHCH_2OCH(OH)CH_2)_2NCH_2COO^-][X^+]$, wherein X is a cation. Also disclosed are ink jet printing processes employing the aforementioned ink.

Copending application U.S. Ser. No. 08/961,637, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, and Aileen M. Montes, the disclosure of which is totally incorporated herein by reference, discloses an ink composition which comprises water, an anionic dye having at least one anionic functional group and having a cationic counterion associated with each anionic functional group, and a material of the formula $[(F_{2n+1}C_nCH_2S)_2(CH_3)C-CH_2CH_2COO^-][B^+]$, wherein n is an integer of from about 8 to about 20 and B is a cation, said ink composition containing alkali metal cations in an amount of no more than about $1 \times 10^{-3}$ moles per liter. Also disclosed are ink jet printing processes employing the aforementioned ink.

Copending application U.S. Ser. No. 08/961,173, filed concurrently herewith, entitled "Improved Ink Compositions for Thermal Ink Jet Printing," with the named inventors Kurt B. Gundlach, Luis A. Sanchez, Richard L. Colt, and Rachael L. McGrath, the disclosure of which is totally incorporated herein by reference, discloses an ink composition which comprises water, a colorant, a bisquaternary ammonium compound, and a material of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are ink jet printing processes employing the aforementioned ink.

Copending application U.S. Ser. No. 08/961,393, filed concurrently herewith, entitled "Improved Ink Compositions for Thermal Ink Jet Printing," with the named inventors Kurt B. Gundlach, Richard L. Colt, Luis A. Sanchez, and Danielle Avolio, the disclosure of which is totally incorporated herein by reference, discloses an ink composition which comprises water, a colorant, 1,4-diazabicyclo[2.2.2]octane, and a fluorinated material selected from the group consisting of (a) those of the formula $[(F_{2n+1}C_nCH_2S)_2(CH_3)C-CH_2CH_2COO^-][B^+]$, wherein n is an integer of from about 8 to about 20 and B is a cation, and (b) those of the formula $[(F_3C(F_2C)_nCH=CHCH_2OCH(OH)CH_2)_2NCH_2COO^-][X^+]$, wherein X is a cation and n is an integer of from about 3 to about 20. Also disclosed are processes for preparing the aforementioned ink and ink jet printing processes employing the aforementioned ink.

Copending application U.S. Ser. No. 08/960,991, filed concurrently herewith, entitled "Improved Ink Compositions for Thermal Ink Jet Printing," with the named inventors Kurt B. Gundlach, Luis A. Sanchez, and Richard L. Colt, the disclosure of which is totally incorporated herein by reference, discloses an ink composition which comprises water, a dye selected from the group consisting of Direct Blue 199, Direct Yellow 132, Acid Yellow 17, Reactive Red 180, Acid Red 52, and mixtures thereof, and a material of the formula [(F₃C(F₂C)$_n$CH=CHCH₂OCH(OH)CH₂)₂NCH₂COO⁻][X⁺], wherein X is a cation and n is an integer of from about 3 to about 20, wherein the ink is substantially free of imidazole. Also disclosed are ink jet printing processes employing the aforementioned ink.

Copending application U.S. Ser. No. 08/960,792, filed concurrently herewith, entitled "Improved Ink Compositions for Thermal Ink Jet Printing," with the named inventors Kurt B. Gundlach, Luis A. Sanchez, Richard L. Colt, and Danielle Avolio, the disclosure of which is totally incorporated herein by reference, discloses an ink composition which comprises (a) water, (b) a colorant selected from the group consisting of Acid Yellow 23, Acid Yellow 17, Reactive Red 180, Direct Blue 199, Acid Blue 9, and mixtures thereof, (c) imidazole, (d) an additive selected from the group consisting of betaine, polyethylene oxide, and mixtures thereof, and (e) a material of the formula [(F₃C(F₂C)$_n$CH=CHCH₂OCH(OH)CH₂)₂NCH₂COO⁻][X⁺], wherein X is a cation and n is an integer of from about 3 to about 20. Also disclosed are ink jet printing processes employing the aforementioned ink.

Copending application U.S. Ser. No. 08/961,334, filed concurrently herewith, entitled "Improved Ink Compositions for Thermal Ink Jet Printing," with the named inventors Kurt B. Gundlach, Luis A. Sanchez, Danielle Avolio, Maura A. Sweeney, and Richard L. Colt, the disclosure of which is totally incorporated herein by reference, discloses an ink composition which comprises (1) water, (2) a colorant, (3) a material of the formula [(F₃C(F₂C)$_n$CH=CHCH₂OCH(OH)CH₂)₂NCH₂COO⁻][X⁺], wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof; and (5) an additive selected from the group consisting of (i) diethylene glycol; (ii) glycerol; (iii) trimethylol propane; (iv) urea; (v) n-methyl pyrrolidone; (vi) sulfolane; (vii) 1,4 diazabicyclo[2.2.2]octane; (viii) cyclohexylpyrrolidone; and (ix) mixtures thereof. Also disclosed are ink jet printing processes employing the aforementioned ink.

While known compositions and processes are suitable for their intended purposes, a need remains for ink compositions with improved characteristics. In addition, a need remains for ink compositions which exhibit improved viscosity stability over time, particularly when exposed to elevated temperatures. Further, a need remains for ink compositions for which reduced heater deposits are observed when the inks are used in thermal ink jet printers. Additionally, a need remains for ink compositions which exhibit improved waterfastness. There is also a need for ink compositions which enable excellent color gamut. In addition, there is a need for ink compositions which enable production of images with high optical densities. Further, there is a need for ink compositions which enable excellent color gamut and high optical density in combination with reduced dye concentration in the ink. Additionally, there is a need for ink compositions with desirable surface tension characteristics. A need also remains for ink compositions which exhibit desirable values for characteristics such as latency, jitter, drop size, and transit time. In addition, a need remains for ink compositions which exhibit improved filterability through 0.2 micron filters and reduced large particulates or flocculated particles. Further, a need remains for ink compositions which exhibit improved homogeneity. Additionally, a need remains for ink compositions with improved thermal stability. There is also a need for ink compositions which enable printing of images with sharp edges. In addition, there is a need for ink compositions which enable printing of images with high solid area density. Further, there is a need for ink compositions which enable printing of images on paper with reduced showthrough and thus with the possibility of printing on both surfaces of the paper sheet. Additionally, there is a need for ink compositions which enable thermal ink jet printing of images onto a substrate wherein the substrate exhibits reduced or no curling subsequent to printing. A need further remains for ink compositions suitable for use in thermal ink jet printing processes wherein the generated images exhibit reduced or no cockle. In addition, a need remains for ink compositions which enable printing of two or more adjacent color areas with reduced or no intercolor bleed.

SUMMARY OF THE INVENTION

It is an object of the present invention to provide ink compositions with the above noted advantages.

It is another object of the present invention to provide ink compositions with improved characteristics.

It is yet another object of the present invention to provide ink compositions which exhibit improved viscosity stability over time, particularly when exposed to elevated temperatures.

It is still another object of the present invention to provide ink compositions for which reduced heater deposits are observed when the inks are used in thermal ink jet printers.

Another object of the present invention is to provide ink compositions which exhibit improved waterfastness.

Yet another object of the present invention is to provide ink compositions which enable excellent color gamut.

Still another object of the present invention is to provide ink compositions which enable production of images with high optical densities.

It is another object of the present invention to provide ink compositions which enable excellent color gamut and high optical density in combination with reduced dye concentration in the ink.

It is yet another object of the present invention to provide ink compositions with desirable surface tension characteristics.

It is still another object of the present invention to provide ink compositions which exhibit desirable values for characteristics such as latency, jitter, drop size, and transit time.

Another object of the present invention is to provide ink compositions which exhibit improved filterability through 0.2 micron filters and reduced large particulates or flocculated particles.

Yet another object of the present invention is to provide ink compositions which exhibit improved homogeneity.

Still another object of the present invention is to provide ink compositions with improved thermal stability.

It is another object of the present invention to provide ink compositions which enable printing of images with sharp edges.

It is yet another object of the present invention to provide ink compositions which enable printing of images with high solid area density.

It is still another object of the present invention to provide ink compositions which enable printing of images on paper with reduced showthrough and thus with the possibility of printing on both surfaces of the paper sheet.

Another object of the present invention is to provide ink compositions which enable thermal ink jet printing of images onto a substrate wherein the substrate exhibits reduced or no curling subsequent to printing.

Yet another object of the present invention is to provide ink compositions suitable for use in thermal ink jet printing processes wherein the generated images exhibit reduced or no cockle.

Still another object of the present invention is to provide ink compositions which enable printing of two or more adjacent color areas with reduced or no intercolor bleed.

These and other objects of the present invention (or specific embodiments thereof) can be achieved by providing an ink composition which comprises water, a colorant, betaine, a tertiary amine, and a material of the formula $[(F_{2n+1}C_nCH_2S)_2(CH_3)C—CH_2CH_2COO^-][B^+]$, wherein n is an integer of from about 8 to about 20 and B is a cation. In one specific embodiment, n is 10 and B is $(HO—CH_2CH_2)_2NH_2^+$. In another specific embodiment, the tertiary amine is 1-methylimidazole. Another embodiment of the present invention is directed to an ink composition which comprises water, a colorant, betaine, a tertiary amine, a material of the formula $[(F_{2n+1}C_nCH_2S)_2(CH_3)C—CH_2CH_2COO^-][B^+]$, wherein n is an integer of from about 8 to about 20 and B is a cation, and an anionic dye with carboxylate groups, sulfonate groups, or both carboxylate and sulfonate groups. Yet another embodiment of the present invention is directed to a process for preparing an ink composition which comprises (a) providing a liquid composition containing a material of the formula $[(F_{2n+1}C_nCH_2S)_2(CH_3)C—CH_2CH_2COO^-][B^+]$, wherein n is an integer of from about 8 to about 20 and B is a cation; (b) subjecting the liquid composition to centrifugation, thereby causing the composition to separate into a supernatant top layer and a flocculated bottom layer; (c) separating the supernatant top layer from the flocculated bottom layer; and (d) admixing the supernatant top layer with an aqueous liquid vehicle and a colorant, thereby forming an ink composition.

DETAILED DESCRIPTION OF THE INVENTION

Inks of the present invention contain an aqueous liquid vehicle, a colorant, betaine, a tertiary amine, and a material of the formula $[(F_{2n+1}C_nCH_2S)_2(CH_3)C—CH_2CH_2COO^-][B^+]$, wherein n is an integer of from about 8 to about 20 and B is a cation. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, tripropylene glycol monomethyl ether, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 60 to about 95 percent by weight of the ink, and preferably from about 70 to about 90 percent by weight of the ink, although the amount can be outside these ranges.

Also contained in the ink composition of the present invention is a colorant. Any suitable colorant can be employed, including dyes, pigments, mixtures thereof, and the like.

Suitable dye or mixture of dyes compatible with the ink liquid vehicle include acid dyes, direct dyes, reactive dyes, and the like, with water soluble anionic dyes being preferred. Examples of suitable dyes include Food dyes such as Food Black No.1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No.3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No.1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight of the ink, and preferably from about 1 to about 10 percent by weight of the ink, although the amount can be outside of these ranges.

In one specific embodiment of the present invention, the dye is an anionic dye having carboxylate groups, sulfonate groups, or both carboxylate and sulfonate groups. Examples of these dyes which are commercially available include the PROJET FAST 2 Series of dyes, available from Zeneca Colours, Dighton, Mass., such as PROJET FAST CYAN 2, PROJET FAST YELLOW 2, PROJET FAST MAGENTA 2, PROJET FAST BLACK 2, and the like. Other examples of suitable anionic dyes include those disclosed in, for example, U.S. Pat. Nos. 4,963,189 and 5,062,893, the disclosures of each of which are totally incorporated herein by reference. Use of these dyes enables ink advantages such as improved thermal stability with respect to viscosity increase, reduced or no heater deposits after 1 million pulses, improved waterfastness, excellent color gamut, high optical density, and the ability to reduce the concentration of dye in the ink.

In one embodiment of the present invention, the ink colorant is an anionic dye having few or no metallic cations associated therewith. Anionic dyes typically are supplied in a form wherein the anionic groups are associated with cationic counterions which are alkali metal cations, such as Na$^+$, Li$^+$, K$^+$, or the like. When anionic dyes having alkali metal cations as counterions are admixed with the fluorinated material present in the inks of the present invention, the fluorinated material and the dye tend to react to form a salt, thereby reducing the shelf life of the ink composition. Salt formation in turn results in the formation of biphase inks, and the top phase (which then constitutes the majority of the ink composition) exhibits increased undesirable intercolor bleed when the ink is printed next to an ink of different color on plain paper substrates. While not being limited to any particular theory, it is believed that replacement of the alkali metal counterions with nonmetallic counterions reduces salt formation, thereby enabling enhanced intercolor bleed control and increased shelf stability with the ink compositions of the present invention.

Any suitable or desired cationic counterions can be employed. One example of a suitable class of cationic counterions is that represented by the general formula

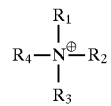

wherein each of $R_1$, $R_2$, $R_3$ and $R_4$, independently of the others, is hydrogen or an alkyl group (including cyclic alkyl groups, wherein the alkyl group can be substituted with, for example, hydroxy groups, halide groups, or the like), preferably with from 1 to about 10 carbon atoms and more preferably with from 1 to about 7 carbon atoms. This class of materials includes ammonia, protonated primary amines, protonated secondary amines, protonated tertiary amines, quaternary ammonium compounds, and the like.

Another example of a suitable class of cationic counterions is protonated polyfunctional amines, such as protonated ethylenediamine, protonated diethylenetriamine, protonated triethylenetetramine, protonated tetraethylenepentamine, protonated pentaethylenehexamine, protonated nitrilotrisethylamine, protonated N,N'-(diaminoethyl) piperazine, protonated piperazinylethylethylenediamine, protonated aminoethyltriethylenetetramine, protonated piperazinylethyldiethylenetriamine, protonated N,N'-bis(3-aminopropyl)ethylenediamine, protonated 1,4-bis(3-aminopropyl)piperazine, protonated N,N'-bis(3-aminopropyl)-1,3-propanediamine, protonated N,N'-bis(2-aminoethyl)-1,3-propanediamine, protonated N,N'-bis(3-aminopropyl)1,4-butanediamine, and the like, as well as mixtures thereof.

Another example of a suitable class of cationic counterions is cationic amides, of the general formula

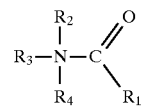

wherein $R_1$ is hydrogen, an alkyl group (including cyclic alkyl groups, wherein the alkyl group can be substituted with, for example, hydroxy groups, halide groups, or the like), preferably with from 1 to about 16 carbon atoms and more preferably with from 1 to about 10 carbon atoms, an amine group (including primary, secondary, tertiary, and quaternary amines), or an alkoxy group, preferably with from 1 to about 16 carbon atoms and more preferably with from 1 to about 10 carbon atoms, and each of $R_2$, $R_3$ and $R_4$, independently of the others, is hydrogen or an alkyl group (including cyclic alkyl groups, wherein the alkyl group can be substituted with, for example, hydroxy groups, halide groups, or the like), preferably with from 1 to about 16 carbon atoms and more preferably with from 1 to about 10 carbon atoms, Specific examples of suitable cations include ammonium (NH$_4^+$), methyl ammonium, dimethyl ammonium, tetramethyl ammonium, ethyl ammonium, diethyl ammonium, β-hydroxyethyl trimethylammonium (choline cation, (CH$_3$)$_3$NCH$_2$OH$^+$), trimethanol ammonium, monoethanol ammonium, diethanol ammonium, triethanol ammonium, protonated dimethylaminopropylamine, and the like.

Any other suitable non-alkali-metal counterions can also be employed.

When the anionic dye is obtained from the supplier with alkali metal counterions, the alkali metal counterions can be replaced with nonmetallic counterions by any suitable or desired process. For example, cation substitution can be accomplished by reverse osmosis. Cation substitution can also be accomplished by ion exchange, in either a two step process, wherein the dye having alkali metal counterions associated therewith is first passed through an acid-loaded ion exchange resin, followed by reaction of the acid form of the dye with the cation as an aqueous solution containing $[C]^+[OH]^-$, wherein $C^+$ is the desired cation, or in a one step process, wherein the dye having alkali metal counterions associated therewith is passed through an ion exchange resin loaded with the desired counterions. Reverse osmosis and ion exchange methods for exchanging dye cations are disclosed in, for example, U.S. Pat. Nos. 4,761,180, 4,786,327, 4,810,292, 5,026,425, and 5,342,439, the disclosures of each of which are totally incorporated herein by reference. Any other desired or suitable methods for exchanging cations can also be employed. For example, the dye having alkali metal cations can be converted to the acid form of the dye, followed by neutralization with the desired base (such as the hydroxide of the desired cation, an amine which, upon reacting with the acid form of the dye, becomes converted to the desired cation, or the like), or the like.

Preferably, no alkali metal cations are present in the inks of the present invention. When dyes are obtained from the suppliers with alkali metal counterions and these counterions are subsequently exchanged for nonmetallic counterions, typically the inks of the present contain alkali metal cations in an amount of no more than about $1 \times 10^{-3}$ moles per liter, preferably no more than about $1 \times 10^{-4}$ moles per liter, and more preferably no more than about $1 \times 10^{-5}$ moles per liter.

Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Hoechst), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Hoechst, including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. Nos. 4,877,451 and 5,378, 574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

Also contained in the ink is a material of the formula

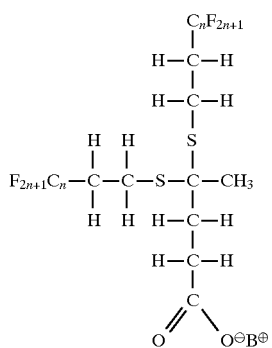

wherein n is an integer of from about 8 to about 20 and B is a cation. In one specific embodiment, n is 10 and B is $(HO—CH_2CH_2)_2NH_2^+$. Other examples of suitable cations include ammonium, $(HO—CH_2CH_2)_3NH^+$, $(HO—CH_2CH_2)NH_3^+$, an imidazolium cation such as imidazolium, N-methyl imidazolium, or N-butyl imidazolium, tris(hydroxymethyl)aminomethane hydrochloride, tris(hydroxymethyl)aminomethane hydrocitrate, protonated 1,4-diazabicyclo[2.2.2]octane, and the like. Materials of this formula are available from, for example, Ciba-Geigy, Ardsley, N.Y. (Greensboro, N.C.) as LODYNE P-201. The fluorinated material of the above formula is present in the ink in any effective or desired amount; typically, the amount ranges from about 0.1 to about 10 percent by weight of the ink, and preferably from about 0.5 to about 5 percent by weight of the ink, although the amount can be outside these ranges.

Also present in the inks of the present invention is betaine. Betaine is commercially available from, for example, Finnsugar Biomedical, Helsinki, Finland. Betaine is present in the ink in any effective or desired amount; typically, the amount ranges from about 5 to about 25 percent by weight of the ink, and preferably from about 10 to about 20 percent by weight of the ink, although the amount can be outside these ranges.

Also present in the inks of the present invention is a tertiary amine. Suitable tertiary amines include those of the formula

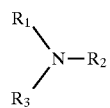

wherein $R_1$, $R_2$, and $R_3$ each, independently of the others, is an alkyl group (including saturated, unsaturated, and cyclic alkyl groups), preferably with from 1 to about 10 carbon atoms, more preferably with from 1 to about 4 carbon atoms, a substituted alkyl group, preferably with from 1 to about 4 carbon atoms, more preferably with from 1 to about 2 carbon atoms, wherein the substituents can be hydroxy groups, alkoxy groups, preferably wherein the alkyl portion of the alkoxy group contains from 1 to about 4 carbon atoms and more preferably from 1 to about 2 carbon atoms, or the like, and wherein two or more of $R_1$, $R_2$, and $R_3$ can be joined together to form a ring. Examples of suitable tertiary amines for the inks of the present invention include triethanolamine, triethylamine, tris[2-(2-methoxyethoxy)ethyl]amine, imidazole, N-butyl imidazole, diethanolamine, and the like. In a specific embodiment of the present invention, the tertiary amine is 1-methylimidazole, of the formula

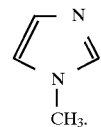

In general, it is believed that lower basicity of the tertiary amine leads to lower pH values at which ink stability and viscosity stability can be achieved; for example, the presence of an amine such as $N(OCH_2CH_3)_3$ enables ink viscosity stability at pH values of about 9.5 or greater, whereas the presence of an amine such as 1-methylimidazole enables ink viscosity stability at pH values of about 8.5 or greater. The tertiary amine is present in the ink in any effective or desired amount; typically, the amount ranges from about 1 to about 25 percent by weight of the ink, and preferably from about 3 to about 20 percent by weight of the ink, although the amount can be outside these ranges. The presence of the tertiary amine in the ink in combination with betaine and the material of the formula $[(F_{2n+1}C_nCH_2S)_2(CH_3)C—CH_2CH_2COO^-][B^+]$ enables advantages such as improved homogeneity, improved 1.2 micron filterability, and thermal stability with respect to viscosity increase. In addition, the basicity of the tertiary amine is reduced when electron withdrawing groups are present, shifting the pH at which amine protonation occurs toward neutrality. For example, thermal stability of inks containing triethanol amine in an amount of from about one to about three times the amount of the material of the formula $[(F_{2n+1}C_nCH_2S)_2(CH_3)C—CH_2CH_2COO^-][B^+]$ in the ink was observed at a pH of over about 8.5. Thermal stability of inks containing the more basic tris[2-(2-methoxyethoxy)ethyl]amine in an amount of from about one to about three times the amount of the material of the formula $[(F_{2n+1}C_nCH_2S)_2(CH_3)C—CH_2CH_2COO^-][B^+]$ in the ink was observed at a pH of over about 9.0. Thermal stability of inks containing the highly basic triethyl amine in an amount of from about one to about three times the amount of the material of the formula $[(F_{2n+1}C_nCH_2S)_2(CH_3)C—CH_2CH_2COO^-][B^+]$ in the ink was observed at a pH of about 10.5 or more. Thermal stability of inks containing 1-methylimidazole (which is less basic than triethanolamine as a result of lone electron pair conjugation with the aromatic ring) in an amount of from about one to about three times the amount of the material of the formula $[(F_{2n+1}C_nCH_2S)_2(CH_3)C—CH_2CH_2COO^-][B^+]$ in the ink was observed at a pH of about 8.0 or more, and in some instances at a pH of about 7.6 or more. Inks containing 1-methylimidazole also exhibited advantages such as reduced or no ink deposits on the printhead heaters after $1\times10^7$ pulses and kogation-free performance in thermal ink jet printers. These inks also exhibited microscopic phase separation (i.e., formation of liposomes) under jetting conditions, which, it is believed, resulted in a significantly reduced surface area to mass ratio that reduced contact with the printer heater surface and thus reduced kogation. The inks also exhibited no macroscopic phase separation (which is undesirable) when maintained at pH conditions of about 7.6 or higher and heated to about 60° C. Any suitable or desired acid can be employed to adjust the pH of the ink to the desired level, such as hydrochloric acid, formic acid, phosphorous acid, or the like, with monomeric compound having at least two carboxylic acid functional groups, such as ethylenediamine tetraacetic acid, aspartic acid, citric acid, malic acid, glutaric acid, adipic acid, oxalic acid, malonic acid, maleic acid, alpha keto glutaric acid, and the like, being preferred.

Optionally, a monomeric compound having at least two carboxylic acid functional groups is also contained in the inks of the present invention. Examples of suitable multifunctional acids include ethylenediamine tetraacetic acid, aspartic acid, citric acid, malic acid, glutaric acid, adipic acid, oxalic acid, malonic acid, maleic acid, alpha keto glutaric acid, and the like. The multifunctional acid is present in the ink in any effective or desired amount, typically from about 0.05 to about 5 percent by weight of the ink, preferably from about 0.2 to about 3 percent by weight of the ink, and more preferably from about 1 to about 2 percent by weight of the ink, although the amount can be outside these ranges. Additional examples of multifunctional acids include those disclosed in columns 19 to 22 of U.S. Pat. No. 5,589,277, the disclosure of which is totally incorporated herein by reference. While not being limited to any particular theory, it is believed that the presence of the multifunctional acid in combination with the fluorocarbon material enhances the shelf stability of the inks of the present invention. The fluorocarbon material in an ink in the absence of a multifunctional acid may exhibit a tendency to salt out of the ink, particularly when the colorant is an anionic dye. It is believed that hydrogen bonding occurs between the polar carboxyl groups of the fluorocarbon material and the carboxyl groups of the multifunctional acid, thereby stabilizing the liposome structure of the fluorocarbon material in the ink. The stabilized ink also exhibits improved jetting characteristics and improved viscosity stability with respect to pH and temperature. It is believed that the stabilized liposome structure renders the liposomes resistant to coalescence, thereby improving resistance to viscosity build.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

In one specific embodiment the ink contains a nonionic surfactant. Any suitable or desired nonionic surfactant may be employed. Examples of suitable nonionic surfactants include octylphenoxy polyethoxy ethanols, such as TRITON X-100, available from Union Carbide Co., Danbury, Conn., acetylenic diols such as 2,4,7,9-tetramethyl-5-decyn-4,7-diol and the like, such as SURFYNOL Ga. and SURFYNOL CT-136, available from Air Products & Chemicals Co., Allentown, Pa. trimethyl nonylpolyethylene-glycol ethers, such as TERGITOL TMN-10 (containing 10 oxyethylene units, believed to be of the formula $C_{12}H_{25}O(C_2H_4O)_5H$), available from Union Carbide Co., Danbury, Conn., non-ionic esters of ethylene oxide, such as MERPOL SH (believed to be of the formula $CH_3(CH_2)_{12}(OC_2H_4)_8OH$), available from E.I. Du Pont de Nemours & Co., Wilmington, Del., non-ionic esters of ethylene oxide and propylene oxide, such as MERPOL LFH (believed to be of the formula $CH_3(CH_2)_n(OC_2H_4)_8(OC_3H_6)_8OH$ where n is an integer from about 12 to about 16), available from E.I. Du Pont de Nemours & Co., Wilmington, Del., and the like, as well as mixtures thereof. The nonionic surfactant is present in the ink in any suitable or desired amount, typically from about 0.1 to about 5 percent by weight of the ink, and preferably from about 0.5 to about 2 percent by weight of the ink, although the amount can be outside of these ranges.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

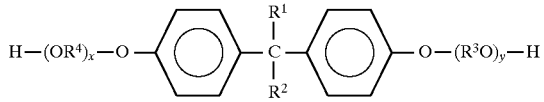

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. At room temperature (i.e., about 25° C.), typically, the ink viscosity is no more than about 5 centipoise, and preferably is from about 1 to about 2.5 centipoise, although the viscosity can be outside this range.

Ink compositions of the present invention can be of any suitable or desired pH. For some embodiments, such as thermal ink jet printing processes, typical pH values are from about 8 to about 9.5, and preferably from about 8.0 to about 9.0, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients and filtering.

In one specific embodiment of the present invention, the material of the formula $[(F_{2n+1}C_nCH_2S)_2(CH_3)C—CH_2CH_2COO^-][B^+]$ is purified prior to admixing it with the other ink ingredients. This material is frequently supplied in liquid form from the commercial supplier as a colloidal suspension. Purification is accomplished by centrifugation of the liquid containing the material. The liquid can contain the material in any suitable or desired amount. Typically, the material of the formula $[(F_{2n+1}C_nCH_2S)_2(CH_3)C—CH_2CH_2COO^-][B^+]$ is present in the liquid in an amount of from about 20 to about 50 percent by weight, and preferably from about 25 to about 35 percent by weight, although the amount can be outside these ranges. To obtain these concentrations, typically a commercially supplied colloidal suspension is diluted by admixing one part by weight of the suspension with about 5 parts by weight of water. Subsequent to centrifugation, the clear supernate contains the purified material and the milky, flocculated bottom layer contains impurities. Typical centrifugation speeds are from about 1,000 to about 20,000 revolutions per minute, and preferably from about 5,000 to about 15,000 revolutions per minute, although the speed can be outside these ranges. Typical centrifugation times are from about 10 to about 60 minutes, and preferably from about 15 to about 30 minutes, although the time can be outside these ranges. In one specific example of this process, LODYNE P-201, which is sold as a solution of the material in water at a concentration of about 30 percent by weight solids, is further diluted by admixing one part by weight of the LODYNE P-201 solution and five parts by weight water. This mixture is then centrifuged at about 10,000 rpm for about 1 hour, thereby generating a supernate containing about 4.25 percent by weight of the solid material. Advantages of inks containing the purified material over inks containing the unpurified material include increased surface tension, improved 1.2 micron filterability, and improved thermal stability with respect to viscosity increase. The inks containing the purified material also exhibit good latency, jitter characteristics, drop size, and transit time.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A solution was prepared as follows. Deionized water (64.99 grams) was admixed with 15.01 grams of betaine (obtained from Finnsugar Biomedical, Helsinki, Finland) and 6.01 grams of triethanolamine (obtained from Aldrich Chemical Co., Milwaukee, Wis.). These materials were stirred for 5 minutes at 23.8° C., after which the pH of the solution was 10.64. Thereafter, dilute phosphorous acid (7 percent by weight of the acid in water) (obtained from Rhone Poulenc, Cranbury, N.J.) was added in an amount of 0.81 grams, bringing the pH of the solution to 9.52 at 23.8° C. Subsequently, 0.101 gram of DOWICIL 150 biocide (obtained from Dow Chemical Co., Midland, Mich.), 3 grams of LODYNE P-201 (obtained from Ciba-Geigy, Ardsley, N.Y.), and 7.08 grams of deionized water were added to the solution, which was then stirred for 30 minutes, after which the solution was homogeneous, very slightly milky, and colorless. The solution was then filtered through a 1.2 micron/#1 Whatman/Celite filter at 20 pounds per square inch over a period of 2 minutes and 20 seconds, yielding 86 grams of filtrate. The freshly filtered solution exhibited a viscosity of 2.09 centipoise and a pH of 9.48 at 23.8° C. After sitting for one day under ambient conditions, the solution exhibited a viscosity of 2.05 centipoise.

Colored inks were then prepared as follows:

To 19.30 grams of the solution thus prepared was added Acid Yellow 23 dye (added as a solution containing 3 percent by weight dye solids, obtained from Tricon, Elmwood Park, N.J., so that a total of 0.7013 gram of dye solids was added), after which the yellow solution was stirred for 10 minutes at room temperature, resulting in a yellow ink.

To 19.31 grams of the solution thus prepared were added Acid Blue 9 dye (added as a solution containing 3 percent by weight dye solids, obtained from Tricon, Elmwood Park, N.J., so that a total of 0.6009 gram of dye solids was added) and 0.11 gram of deionized water, after which the cyan solution was stirred for 10 minutes at room temperature, resulting in a cyan ink.

To 19.34 grams of the solution thus prepared was added Reactive Red 180 dye (added as a solution containing 3 percent by weight dye solids, obtained from Hoechst, Coventry, R.I., so that a total of 0.7000 gram of dye solids was added), after which the magenta solution was stirred for 10 minutes at room temperature, resulting in a magenta ink.

The inks thus prepared were incorporated into a Hewlett-Packard DJ-500C thermal ink jet printer and used to generate prints at 300 dots per inch on a variety of plain papers, recycled office papers, and paper towels. A five second delay was employed between printing of colors, during which the printed colors were subjected to heat with a heat gun. The resulting prints exhibited no intercolor bleed. It is believed that no heat and delay process will be needed to reduce intercolor bleed when the inks are employed to generate images at 600 dots per inch.

EXAMPLE II

A solution was prepared as follows. Deionized water (129.42 grams) was admixed with 30 grams of betaine (obtained from Finnsugar Biomedical, Helsinki, Finland) and 12 grams of 1-methylimidazole (obtained from Aldrich Chemical Co., Milwaukee, Wis.). These materials were stirred to homogeneity at 25.0° C., after which the pH of the solution was 10.73. Thereafter, phosphorous acid (70 percent by weight of the acid in water) (obtained from Rhone Poulenc, Cranbury, N.J.) was added in an amount of 0.82 grams, bringing the pH of the solution to 8.12 at 26.1° C. Subsequently, 0.2003 gram of DOWICIL 150 biocide (obtained from Dow Chemical Co., Midland, Minn.), 5.99 grams of LODYNE P-201 (obtained from Ciba-Geigy, Ardsley, N.Y.), and 14.58 grams of deionized water were added to the solution, which was then stirred for 30 minutes, after which the solution was homogeneous, very slightly milky, and colorless. The solution was then filtered through a 1.2 micron nylon filter and a 5 micron nylon/Celite filter at 20 pounds per square inch over a period of 1 minutes and 40 seconds. The freshly filtered solution exhibited a viscosity of 1.97 centipoise, a pH of 8.22 at 26.1° C., and a surface tension of 31.2 dynes per centimeter. The solution was then placed in an oven and maintained at 60° C. for 20 hours, after which the solution exhibited a viscosity of 2.40 centipoise and exhibited no phase separation.

To 48.25 grams of the solution thus prepared were added 1.74 grams of Acid Yellow 23 dye (DUASYN Acid Yellow XX-SF LP-413, obtained from Hoechst, Coventry, R.I.). The yellow solution was stirred for 10 minutes at room temperature, resulting in formation of a yellow ink with a viscosity of 2.19 centipoise and a pH of 8.27 at 26.1° C. The yellow ink was then placed in an oven and maintained at 60° C. for 20 hours, after which the yellow ink exhibited a viscosity of 2.86 centipoise and exhibited no phase separation. The ink thus prepared was incorporated into a thermal ink jet test fixture and used to generate images. No traces of ink deposits on the printhead heater were observed after $8\times10^6$ pulses at 31.0 volts.

To 48.25 grams of the solution thus prepared were added 1.76 grams of Reactive Red 180 dye (DUASYN Brilliant Red F3B-SF VP218, obtained from Hoechst, Coventry, R.I.). The magenta solution was stirred for 10 minutes at room temperature, resulting in formation of a yellow ink with a viscosity of 2.15 centipoise and a pH of 8.22 at 26.1° C. The magenta ink was then placed in an oven and maintained at 60° C. for 20 hours, after which the magenta ink exhibited a viscosity of 2.09 centipoise and exhibited no phase separation. The magenta ink was maintained for another day under ambient conditions, after which the magenta ink exhibited a viscosity of 2.15 centipoise. The ink thus prepared was incorporated into a thermal ink jet test fixture and used to generate images. No traces of ink deposits on the printhead heater were observed after $4\times10^6$ pulses at 31.0 volts.

To 48.75 grams of the solution thus prepared were added 1.49 grams of Acid Blue 9 dye (DUASYN Acid Blue AE-SF VP344, obtained from Hoechst, Coventry, R.I.) and 0.25 gram of deionized water. The cyan solution was stirred for 10 minutes at room temperature, resulting in formation of a cyan ink with a viscosity of 1.99 centipoise and a pH of 8.21 at 26.1° C. The cyan ink was then placed in an oven and maintained at 60° C. for 20 hours, after which the cyan ink exhibited a viscosity of 7.78 centipoise and exhibited no phase separation. The cyan ink was maintained for another day under ambient conditions, after which the cyan ink exhibited a viscosity of 1.99 centipoise.

The inks thus prepared were incorporated into a Hewlett-Packard DJ-500C thermal ink jet printer and used to generate prints at 300 dots per inch on a variety of plain papers, recycled office papers, and paper towels. A five second delay was employed between printing of colors, during which the printed colors were subjected to heat with a heat gun. The resulting prints exhibited no intercolor bleed. It is believed that no heat and delay process will be needed to reduce intercolor bleed when the inks are employed to generate images at 600 dots per inch.

EXAMPLE III

A yellow ink composition was prepared as follows. To 66.65 grams of PROJET FAST YELLOW 2 dye (containing 4.5 percent by weight dye solids, obtained from Zeneca, Dighton, Mass.) was added 15.02 grams of betaine (obtained from Finnsugar Biomedical, Helsinki, Finland) and 6.01 grams of 1-methylimidazole (obtained from Aldrich Chemical Co., Milwaukee, Wis.). These materials were stirred to homogeneity at 25.4° C., after which the pH of the solution was 9.09. Thereafter, phosphorous acid (70 percent by weight of the acid in water) (obtained from Rhone Poulenc, Cranbury, N.J.) was added in an amount of 0.37 gram, bringing the pH of the solution to 8.47 at 26.1° C. Subsequently, 0.1001 gram of DOWICIL 150 biocide (obtained from Dow Chemical Co., Midland, Minn.), 3.01 grams of LODYNE P-201 (obtained from Ciba-Geigy, Ardsley, N.Y.), and 8.96 grams of deionized water were added to the solution, which was then stirred for 30 minutes, after which the solution was homogeneous. The solution was then filtered through a 1.2 micron nylon filter and a 5 micron nylon/Celite filter at 20 pounds per square inch over a period of 45 seconds. The freshly filtered yellow ink exhibited a viscosity of 2.17 centipoise and a pH of 8.52 at 26.1° C. The yellow ink was then placed in an oven and maintained at 60° C. for 3 days, after which the yellow ink exhibited a viscosity of 2.35 centipoise and exhibited no phase separation. The yellow ink was maintained for another 3 days at 60° C., after which the yellow ink exhibited a viscosity of 2.64 centipoise. The yellow ink was subsequently maintained for 6 more days under ambient conditions, after which the yellow ink exhibited a viscosity of 2.09 centipoise. The yellow ink was applied to COURTLAND 4024 DP paper with a #3 wire wound rod to form an image, which image was then allowed to remain under ambient conditions for 1 day. Thereafter, the image was soaked in deionized water for 5 minutes. The optical density of the image prior to soaking was 0.78 and subsequent to soaking was 0.70, indicating a waterfastness of 90 percent.

A cyan ink composition was prepared as follows. To 66.68 grams of PROJET FAST CYAN 2 dye (containing 4.5 percent by weight dye solids, obtained from Zeneca, Dighton, Mass.) was added 15.01 grams of betaine (obtained from Finnsugar Biomedical, Helsinki, Finland) and 6 grams of 1-methylimidazole (obtained from Aldrich Chemical Co., Milwaukee, Wis.). These materials were stirred to homogeneity at 25.6° C., after which the pH of the solution was 8.83. Thereafter, phosphorous acid (70 percent by weight of the acid in water) (obtained from Rhone Poulenc, Cranbury, N.J.) was added in an amount of 0.22 gram, bringing the pH of the solution to 8.49 at 26.1° C. Subsequently, 0.1004 gram of DOWICIL 150 biocide (obtained from Dow Chemical Co., Midland, Minn.), 3.01 grams of LODYNE P-201 (obtained from Ciba-Geigy, Ardsley, N.Y.), and 9.12 grams of deionized water were added to the solution, which was then stirred for 30 minutes, after which the solution was homogeneous. The solution was then filtered through a 1.2 micron nylon filter and a 5 micron nylon/Celite filter at 20 pounds per square inch over a period of 2 minutes. The freshly filtered cyan ink exhibited a viscosity of 2.15 centipoise and a pH of 8.64 at 26.1° C. The cyan ink was then placed in an oven and maintained at 60° C. for 3 days, after which the cyan ink exhibited a viscosity of 2.20 centipoise and exhibited no phase separation. The cyan ink was maintained for another 3 days at 60° C., after which the cyan ink exhibited a viscosity of 2.27 centipoise. The cyan ink was subsequently maintained for 6 more days under ambient conditions, after which the cyan ink exhibited a viscosity of 2.12 centipoise. The cyan ink was applied to COURTLAND 4024 DP paper with a #3 wire wound rod to form an image, which image was then allowed to remain under ambient conditions for 1 day. Thereafter, the image was soaked in deionized water for 5 minutes. The optical density of the image prior to soaking was 1.25 and subsequent to soaking was 1.17, indicating a waterfastness of 94 percent.

A magenta ink composition was prepared as follows. To 60.03 grams of PROJET FAST MAGENTA 2 dye (containing 5 percent by weight dye solids, obtained from Zeneca, Dighton, Mass.) was added 5.07 grams of deionized water, 15.01 grams of betaine (obtained from Finnsugar Biomedical, Helsinki, Finland) and 6.01 grams of 1-methylimidazole (obtained from Aldrich Chemical Co., Milwaukee, Wis.). These materials were stirred to homogeneity at 25.6° C., after which the pH of the solution was 8.83. Thereafter, phosphorous acid (70 percent by weight of the acid in water) (obtained from Rhone Poulenc, Cranbury, N.J.) was added in an amount of 0.18 gram, bringing the pH of the solution to 8.49 at 26.1° C. Subsequently, 0.1003 gram of DOWICIL 150 biocide (obtained from Dow Chemical Co., Midland, Minn.), 3 grams of LODYNE P-201 (obtained from Ciba-Geigy, Ardsley, N.Y.), and 10.73 grams of deionized water were added to the solution, which was then stirred for 30 minutes, after which the solution was homogeneous. The solution was then filtered through a 1.2 micron nylon filter and a 5 micron nylon/Celite filter at 20 pounds per square inch over a period of 43 seconds. The freshly filtered magenta ink exhibited a viscosity of 2.27 centipoise and a pH of 8.56 at 26.1° C. The magenta ink was then placed in an oven and maintained at 60° C. for 3 days, after which the magenta ink exhibited a viscosity of 2.27 centipoise and exhibited no phase separation. The magenta ink was maintained for another 3 days at 60° C., after which the magenta ink exhibited a viscosity of 2.35 centipoise. The magenta ink was subsequently maintained for 6 more days under ambient conditions, after which the magenta ink exhibited a viscosity of 2.35 centipoise. When subjected to shear at 60 rpm over 15 minutes, the ink viscosity rose to 2.61 centipoise. The magenta ink was applied to COURTLAND 4024 DP paper with a #3 wire wound rod to form an image, which image was then allowed to remain under ambient conditions for 1 day. Thereafter, the image was soaked in deionized water for 5 minutes. The optical density of the image prior to soaking was 1.28 and subsequent to soaking was 1.06, indicating a waterfastness of 83 percent.

A black ink composition was prepared as follows. To 70.01 grams of PROJET FAST BLACK 2 dye (containing 5 percent by weight dye solids, obtained from Zeneca, Dlghton, Mass.) was added 15.01 grams of betaine (obtained from Finnsugar Biomedical, Helsinki, Finland) and 6 grams of 1-methylimidazole (obtained from Aldrich Chemical Co., Milwaukee, Wis.). These materials were stirred to homogeneity at 25.1° C., after which the pH of the solution was 8.91. Thereafter, phosphorous acid (70 percent by weight of the acid in water) (obtained from Rhone Poulenc, Cranbury, N.J.) was added in an amount of 0.31 gram, bringing the pH of the solution to 8.43 at 25.9° C. Subsequently, 0.0997 gram of DOWICIL 150 biocide (obtained from Dow Chemical Co., Midland, Minn.), 3.01 grams of LODYNE P-201 (obtained from Ciba-Geigy, Ardsley, N.Y.), and 5.86 grams of deionized water were added to the solution, which was then stirred for 30 minutes, after which the solution was homogeneous. The solution was then filtered through a 1.2 micron nylon filter and a 5 micron nylon/Celite filter at 20 pounds per square inch over a period of 40 seconds. The freshly filtered black ink exhibited a viscosity of 2.09 centipoise and a pH of 8.62 at 25.9° C. The black ink was then placed in an oven and maintained at 60° C. for 3 days, after which the black ink exhibited a viscosity of 2.02 centipoise and exhibited no phase separation. The black ink was maintained for another 3 days at 60° C., after which the black ink exhibited a viscosity of 2.19 centipoise. The black ink was subsequently maintained for 6 more days under ambient conditions, after which the black ink exhibited a viscosity of 1.99 centipoise. The black ink was applied to COURTLAND 4024 DP paper with a #3 wire wound rod to form an image, which image was then allowed to remain under ambient conditions for 1 day. Thereafter, the image was soaked in deionized water for 5 minutes. The optical density of the image prior to soaking was 1.31 and subsequent to soaking was 1.28, indicating a waterfastness of 98 percent.

EXAMPLE IV

To 800 grams of deionized water was added 200 grams of LODYNE P-201 (obtained from Ciba-Geigy, Ardsley, N.Y.), resulting in formation of a light green, milky colloidal solution. The solution thus prepared was centrifuged for 1 hour at 10,000 rpm in 40 gram portions after which the supernatant liquid was removed with a pipet from the flocculated bottom layer.

Deionized water (115.44 grams) was admixed with 45 grams of betaine (obtained from Finnsugar Biomedical, Helsinki, Finland) and 18 grams of 1-methylimidazole (obtained from Aldrich Chemical Co., Milwaukee, Wis.). These materials were stirred to homogeneity at 25.0° C., after which the pH of the solution was 10.73. Thereafter, phosphorous acid (70 percent by weight of the acid in water) (obtained from Rhone Poulenc, Cranbury, N.J.) was added in an amount of 0.34 grams, bringing the pH of the solution to 8.70 at 26.3° C. Subsequently, 0.2999 gram of DOWICIL 150 biocide (obtained from Dow Chemical Co., Midland, Minn.), 99.99 grams of the purified LODYNE P-201 prepared by centrifugation hereinabove, and 12.19 grams of deionized water were added to the solution, which was then stirred for 30 minutes, after which the solution was homogeneous. The solution was then filtered through a 1.2 micron nylon filter and a 5 micron nylon/Celite filter at 5 pounds per square inch over a period of 40 seconds.

To 87.3 grams of the solution thus prepared were added 2.71 grams of Acid Yellow 23 dye (DUASYN Acid Yellow XX-SF LP-413, obtained from Hoechst, Ardsley, N.Y.). The yellow solution was stirred for 30 minutes at room temperature, resulting in formation of a yellow ink with a viscosity of 2.29 centipoise, a surface tension of 36.3 dynes per centimeter, a conductivity of 6.58 millimhos, and a pH of 8.87 at 25.0° C. The yellow ink was then placed in an oven and maintained at 60° C. for 3 days, after which the yellow ink exhibited a viscosity of 2.70 centipoise.

To 87.29 grams of the solution thus prepared were added 2.47 grams of Acid Blue 9 dye (DUASYN Acid Blue AE-SF VP344, obtained from Hoechst, Ardsley, N.Y.) and 0.21 gram of deionized water. The cyan solution was stirred for 30 minutes at room temperature, resulting in formation of a cyan ink with a viscosity of 2.07 centipoise, a surface tension of 37.3 dynes per centimeter, a conductivity of 3.80 millimhos, and a pH of 8.83 at 24.4° C. The cyan ink was then placed in an oven and maintained at 60° C. for 3 days, after which the cyan ink exhibited a viscosity of 2.05 centipoise.

To 87.3 grams of the solution thus prepared were added 2.7 grams of Reactive Red 180 dye (DUASYN Brilliant Red F3B-SF VP218, obtained from Hoechst, Ardsley, N.Y.). The magenta solution was stirred for 30 minutes at room temperature, resulting in formation of a magenta ink with a viscosity of 2.24 centipoise, a surface tension of 36.7 dynes per centimeter, a conductivity of 5.85 millimhos, and a pH of 8.74 at 24.4° C. The magenta ink was then placed in an oven and maintained at 60° C. for 3 days, after which the magenta ink exhibited a viscosity of 2.20 centipoise.

The inks thus prepared were incorporated into a Hewlett-Packard DJ-500C thermal ink jet printer and used to generate prints at 300 dots per inch on a variety of plain papers, recycled office papers, and paper towels. A five second delay was employed between printing of colors, during which the printed colors were subjected to heat with a heat gun.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, a colorant, betaine, a tertiary amine, and a material of the formula $[(F_{2n+1}C_nCH_2S)_2(CH_3)C-CH_2CH_2COO^-][B^+]$, wherein n is an integer of from about 8 to about 20 and B is a cation.

2. An ink composition according to claim 1 wherein n is 10.

3. An ink composition according to claim 1 wherein B is $(HO-CH_2CH_2)_2NH_2^+$.

4. An ink composition according to claim 1 wherein the tertiary amine is 1-methylimidazole.

5. An ink composition according to claim 1 wherein the tertiary amine is triethanolamine, triethylamine, tris[2-(2-methoxyethoxy)ethyl]amine, imidazole, N-butyl imidazole, or diethanolamine.

6. An ink composition according to claim 1 wherein the colorant is selected from anionic dyes having carboxylate groups, anionic dyes having sulfonate groups, anionic dyes having both carboxylate and sulfonate groups, and mixtures thereof.

7. An ink composition according to claim 1 wherein betaine is present in an amount of from about 5 to about 25 percent by weight of the ink.

8. An ink composition according to claim 1 wherein the tertiary amine is present in an amount of from about 1 to about 25 percent by weight of the ink.

9. An ink composition according to claim 1 wherein the material of the formula $[(F_{2n+1}C_nCH_2S)_2(CH_3)C-CH_2CH_2COO^-][B^+]$ is present in an amount of from about 0.1 to about 10 percent by weight of the ink.

10. A process for preparing an ink composition which comprises (a) providing a liquid composition containing a material of the formula $[(F_{2n+1}C_nCH_2S)_2(CH_3)C-CH_2CH_2COO^-][B^+]$, wherein n is an integer of from about 8 to about 20 and B is a cation; (b) subjecting the liquid composition to centrifugation, thereby causing the composition to separate into a supernatant top layer and a flocculated bottom layer; (c) separating the supernatant top layer from the flocculated bottom layer; and (d) admixing the supernatant top layer with an aqueous liquid vehicle and a colorant, thereby forming an ink composition.

11. A process according to claim 10 wherein centrifugation is carried out for a period of from about 10 to about 60 minutes.

12. A process according to claim 10 wherein centrifugation is at a speed of from about 1,000 to about 20,000 revolutions per minute.

13. A process according to claim 10 wherein the material of the formula $[(F_{2n+1}C_nCH_2S)_2(CH_3)C-CH_2CH_2COO^-][B^+]$ is present in the liquid in an amount of from about 20 to about 50 percent by weight.

14. A process according to claim 10 wherein the liquid also contains water.

15. A process which entails incorporating an ink according to claim 1 into an ink jet printing apparatus and causing droplets of the ink composition to be ejected in an imagewise pattern onto a substrate.

16. A process according to claim 15 wherein the printing apparatus employs a thermal ink jet process wherein the ink in the nozzles is selectively heated in an imagewise pattern, thereby causing droplets of the ink to be ejected in imagewise pattern.

* * * * *